US008348145B2

(12) United States Patent
Pratt

(10) Patent No.: US 8,348,145 B2
(45) Date of Patent: Jan. 8, 2013

(54) SYSTEMS AND METHODS FOR PROGRAMMING A REMOTE CONTROL DEVICE

(75) Inventor: James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 542 days.

(21) Appl. No.: 12/618,713

(22) Filed: Nov. 14, 2009

(65) Prior Publication Data

US 2011/0114716 A1  May 19, 2011

(51) Int. Cl.
*G06F 17/00* (2006.01)
(52) U.S. Cl. ......... 235/375; 348/569; 348/734; 315/152
(58) Field of Classification Search .................. 235/375; 348/569, 734; 340/12.28, 825.69; 315/152
See application file for complete search history.

(56) References Cited

U.S. PATENT DOCUMENTS

| | | | |
|---|---|---|---|
| 7,620,703 B1 * | 11/2009 | Shteyn | 709/220 |
| 2004/0203387 A1 | 10/2004 | Grannan | |
| 2008/0094245 A1 | 4/2008 | Hardacker et al. | |
| 2008/0174468 A1 * | 7/2008 | Drimusz | 341/176 |
| 2009/0133015 A1 * | 5/2009 | Nagashima | 717/176 |
| 2009/0141174 A1 * | 6/2009 | Hardacker et al. | 348/569 |
| 2009/0172767 A1 * | 7/2009 | Li et al. | 725/139 |
| 2010/0028010 A1 * | 2/2010 | Zhao et al. | 398/106 |
| 2010/0039282 A1 * | 2/2010 | Hostage et al. | 340/825.22 |
| 2010/0208145 A1 * | 8/2010 | VanDuyn et al. | 348/734 |

* cited by examiner

*Primary Examiner* — Allyson Trail
(74) *Attorney, Agent, or Firm* — Toler Law Group, PC

(57) ABSTRACT

Methods and systems are disclosed that include retrieving codes that are usable by a remote control device to remotely control a function of the electronic device. The methods and systems may also include transmitting the codes to the remote control device via a remote control device interface controllable by a processor of the electronic device.

20 Claims, 10 Drawing Sheets

SYSTEMS AND METHODS FOR PROGRAMMING A REMOTE CONTROL DEVICE

FIELD OF THE DISCLOSURE

The present disclosure is generally related to programming a remote control device.

BACKGROUND

Users of televisions and other electronic home entertainment devices may purchase universal remote controls to increase the convenience of using home entertainment devices. Universal remote controls may enable users to reduce a number of remote controls that are needed in the home entertainment environment. However, universal remote controls may be difficult to program. The number of home entertainment devices to be controlled by a universal remote control is increasing. Additionally, the number of features offered by home entertainment devices is increasing. The current method of programming universal remote controls, which includes entering device codes and manual setup through the use of an original remote control for each electronic device to be controlled, is time-consuming.

Universal remote control manufacturers have begun to offer computer-based methods of programming remote controls. These computer-based methods of programming remote controls offer some convenience as the user receives more user-friendly options for programming the remote control. In addition, the universal remote control may stay current because device codes for controlling home entertainment devices are generally kept up-to-date in online repositories. However, the computer-based methods of programming universal remote controls still require a significant amount of user intervention for programming each device in a home entertainment system. Moreover, the programming is generally done by physically connecting the universal remote control to a computer that may be at a different location than a home entertainment system.

DETAILED DESCRIPTION

Systems and methods for programming a remote control device are disclosed. The systems and methods may enable an electronic device to transmit codes to the remote control device. The codes may be usable by the remote control device to remotely control one or more functions of the electronic device.

In a first particular embodiment, an electronic device is disclosed that includes a remote control device interface and a processor. The electronic device also includes a memory that is accessible to the processor. The memory includes codes that are usable by a remote control device to remotely control one or more functions of the electronic device. The codes can be transmitted from the electronic device via the remote control device interface to the remote control device.

In a second particular embodiment, a remote control device is disclosed that includes an electronic device interface and a processor. The remote control device also includes a light emitting diode (LED) configured to emit a series of infrared light pulses representing an instruction to perform a particular function at one or more electronic devices. The remote control device also includes a memory accessible to the processor. The memory includes codes associated with one or more functions of at least one electronic device. The electronic device interface is controllable by the processor to receive the codes from one or more electronic devices.

In a third particular embodiment, a method is disclosed that includes retrieving codes from a memory of an electronic device. The codes are usable by a remote control device to remotely control at least one function of the electronic device. The method also includes transmitting the codes to the remote control device via a remote control device interface that is controllable by a processor. Examples of functions that may be executed by an electronic device include adjusting a volume of an audio output of the electronic device, changing a setting of a tuner of the electronic device, starting delivery of content (e.g., audio content, video content, audio/video content) via the electronic device, stopping delivery of the content via the electronic device, and powering on/off the electronic device.

Figure 1:
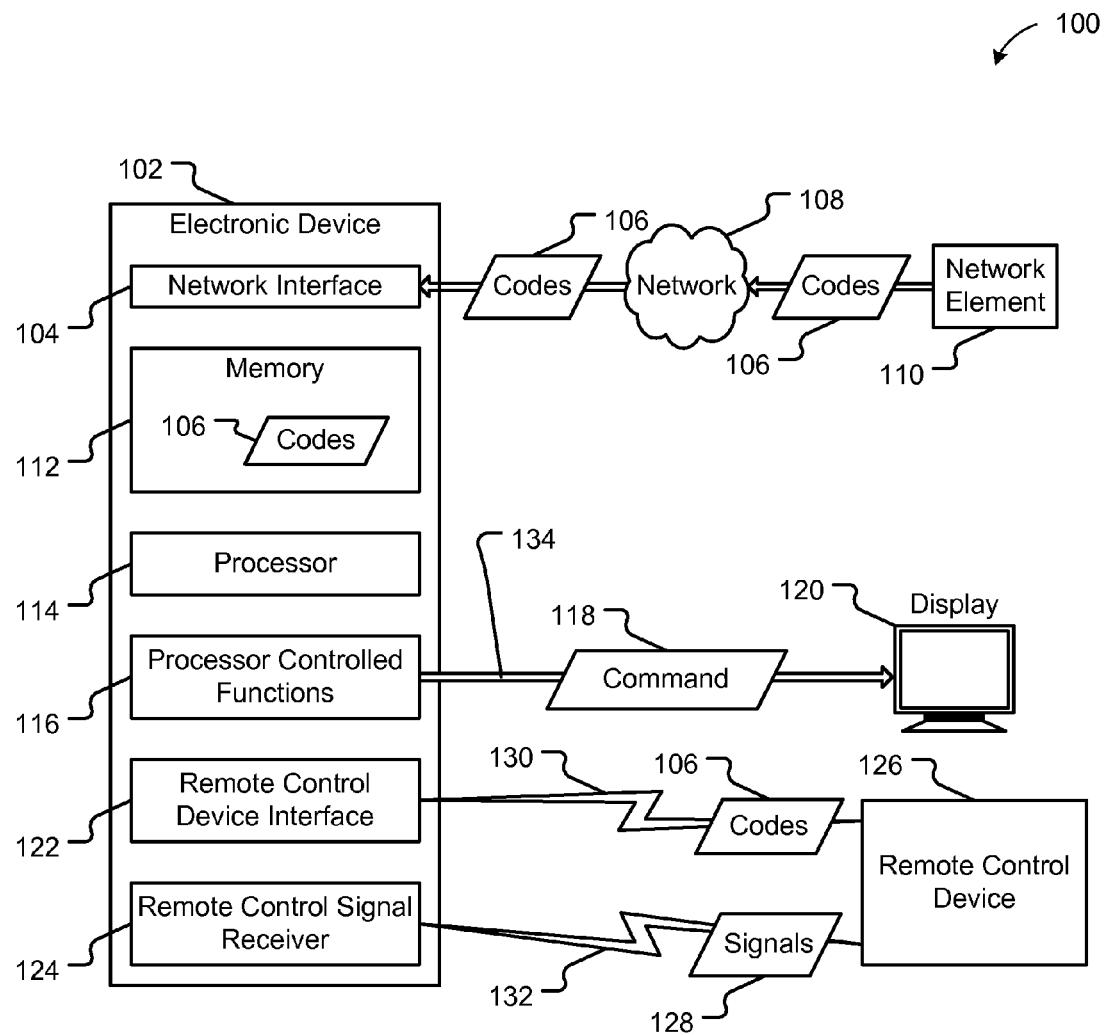
FIG. 1 is a block diagram of a first particular embodiment of a system to program a remote control device.

Referring to FIG. 1, a system 100 is depicted for programming a remote control device. The system 100 includes an electronic device 102, a network element 110, a display 120, and a remote control device 126. The electronic device 102 is configured to communicate with the network element 110 over a network 108. The electronic device 102 is also configured to communicate with the remote control device 126 over wireless paths 130, 132. The electronic device is further configured to communicate with the display over a communications path 134.

The electronic device 102 includes a memory 112, a processor 114, and a remote control device interface 122. The electronic device 102 may also include a network interface 104, processor controlled functions 116, and a remote control signal receiver 124.

The processor controlled functions 116 are executable by the electronic device 102 to alter at least one attribute or setting of the electronic device 102. For example, a first particular processor controlled function may, when executed, increase a volume of an audio output of the electronic device 102. A second particular processor controlled function may, when executed, decrease the volume of an audio output of the electronic device 102. Additional processor controlled functions may, when executed, display a list of content recorded at the electronic device, change a setting of a tuner of the electronic device, or change a designated input (e.g., a first high-definition multimedia interface (HDMI) port, a second HDMI port, a universal serial bus (USB) port, or an S-Video port) for the electronic device.

The memory 112 includes codes 106. The codes 106 are transmittable from the electronic device 102 to the remote control device 126. The codes 106 are usable by the remote control device 126 to remotely control at least one function of the electronic device 102. The codes 106 may be embodied as a bit pattern, a numeric value, or as any other unique identifier. Each particular code may correspond to a particular processor controlled function executable by the electronic device 102. For example, a first code may correspond to a first function used to increase the volume of an audio output of the electronic device 102. Likewise, a second code may correspond to a second function used to decrease the volume of an audio output at the electronic device 102. Additional codes may correspond to additional functions to display a list of available content that may be delivered via the electronic device 102, to schedule content for recording at the electronic device 102, or to fast-forward content being delivered via the electronic device 102.

The remote control device interface 122 may be used for wireless data communications from the electronic device 102 to the remote control device 126. For example, the remote control device interface 122 may be used to communicate the codes 106 from the electronic device 102 to the remote control device 126 over the wireless path 130. In a particular embodiment, the remote control device interface 122 is embodied as a wireless transceiver. The remote control device interface 122 may communicate using various wireless standards including Institute of Electrical and Electronics Engineers (IEEE) 802.11 (Wi-Fi) and ultra-wideband.

The remote control signal receiver 124 may also be used by the electronic device 102 to receive wireless commands from the remote control device 126. For example, the remote control signal receiver 124 may be used to receive signals 128 from the remote control device 126 over the wireless path 132. The signals 128 may represent a particular code, from the codes 106, associated with a particular function to be executed at the electronic device 102. The remote control signal receiver 124 may be embodied, for example, as an infrared (IR) receiver or a radio frequency (RF) receiver.

The network interface 104 may be used to communicate with a network element 110 over a data communication network 108. For example, the network interface 104 may be used to request one or more of the codes 106 for the electronic device 102. To receive the codes 106, the identity of the electronic device 102, such as a model number, may be transmitted to the network element 110. The network element 110 may subsequently determine a particular set of codes 106 usable to control one or more functions of the electronic device 102 based on the identity of the electronic device 102 and may transmit the particular set of codes 106 to the electronic device 102. The network element 110 may be embodied, for example, as a server, a database, or any other data source capable of storing codes 106 associated with the electronic device 102.

During operation, the electronic device 102 is configured to send the codes 106 to the remote control device 126. The codes 106 may be sent to the remote control device 126 in response to physical contact between the electronic device 102 and the remote control device 126. For example, the electronic device 102 may include a docking station or other component configured for physical mating with the remote control device 126. In an alternative embodiment, the electronic device 102 may communicate the codes 106 to the remote control device 126 upon detecting that the remote control device 126 is sufficiently close in physical proximity to the electronic device 102. For example, the electronic device 102 may be configured such that the codes 106 are communicated to the remote control device 126 when the remote control device 126 is close enough to the electronic device 102 to receive communications from the remote control device interface 122 (e.g., within a wireless transmission area).

The codes 106 are usable by the remote control device 126 to remotely control one or more functions of the electronic device 102. The codes 106 transmitted from the electronic device 102 to the remote control device 126 may be stored in a memory (not shown) of the remote control device 126. After the remote control device 126 has received and stored the codes 106, the remote control device 126 can be enabled to initiate execution of the processor controlled functions 116 at the electronic device 102. The remote control device 126 may initiate execution of the processor controlled functions 116 at the electronic device 102 by transmitting a signal 128 to the remote control signal receiver 124 of the electronic device 102. The signal 128 may be translated into a particular code that is associated with a particular processor controlled function, at which time the processor 114 may execute the particular processor controlled function associated with the received signal.

Executing a particular processor controlled function may be carried out by issuing a command 118 to a component of the electronic device. For example, a command 118 may be issued to the display 120, thereby causing an attribute of the display 120 to be adjusted. An attribute of the display 120 may include a particular setting of the display 120, such as a volume setting of a speaker housed within the display 120, an aspect ratio setting of the display 120, and a brightness setting for the display 120. As an example, the command 118 may cause the aspect ratio of the display 120 to be adjusted or may cause the brightness setting of the display 120 to be adjusted. Although the display 120 is depicted as being located outside of the electronic device 102, the display device 120 may alternatively be included within the housing of the electronic device 102.

The system 100 may enable a remote control device to be programmed automatically by being located within communication range of an electronic device. Because the electronic device may be configured to transmit function initiating codes to a remote control device, the remote control device may be programmed automatically, without a user performing the task of manually entering codes to program the remote control device. Thus, when a remote control device is within communication range of the electronic device, the remote control device may be automatically programmed such that the remote control device may be used to control the electronic device.

Figure 2:
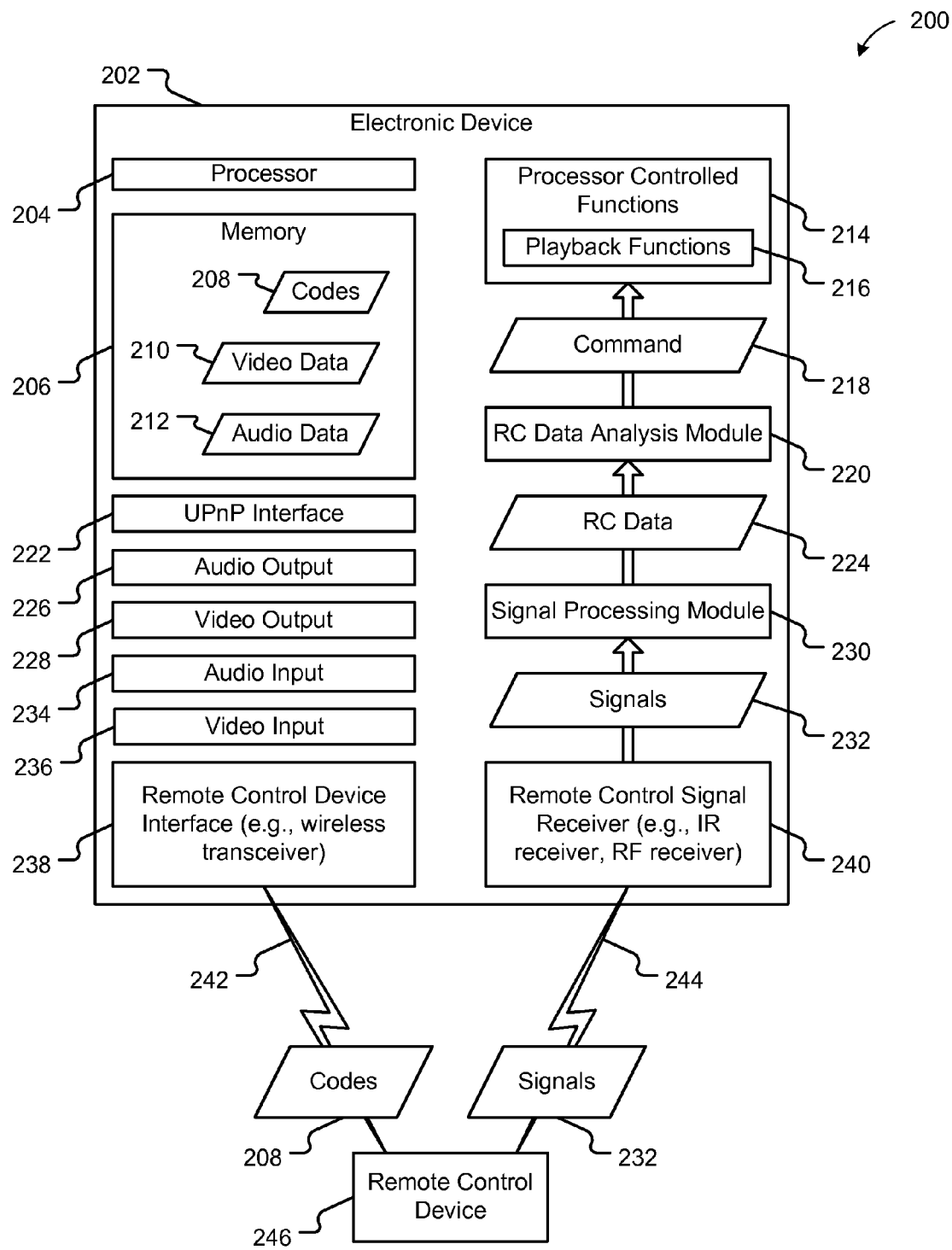
FIG. 2 is a block diagram of a second particular embodiment of a system to program a remote control device.

Referring to FIG. 2, a system 200 is depicted for programming a remote control device. The system includes an electronic device 202 and a remote control device 246. In an illustrative embodiment, the remote control device 246 is the remote control device 126 of FIG. 1 and the electronic device 202 is the electronic device 102 of FIG. 1. The electronic device 202 may be configured to communicate with the remote control device 246 over wireless paths 242, 244. The electronic device 202 includes a processor 204, a memory 206, a universal plug and play (UPnP) interface 222, an audio output 226, a video output 228, an audio input 234, and a video input 236. The electronic device 202 further includes a remote control device interface 238, a remote control signal receiver 240, a signal processing module 230, a remote control (RC) data analysis module 220, and processor controlled functions 214.

The audio input 234 and the video input 236 may be used by the electronic device 202 to receive audio and video signals. Although the audio input 234 and the video input 236 are illustrated as being distinct components of the electronic device 102, the audio input 234 and the video input 236 may be embodied as a single input. For example, the audio input 234 and the video input 236 may be embodied as a single input on a television capable of receiving audio and video content, such as a coaxial cable input or an HDMI input. The audio output 226 and the video output 228 may be used by the electronic device 202 to transmit audio content and video content. For example, the audio output 226 may send audio signals to a speaker and the video output 228 may send video signals to a display.

The memory 206 includes codes 208. The codes 208 are usable by the remote control device 246 to remotely control one or more functions of the electronic device 202. The memory 206 further includes video data 210 and audio data 212. Although depicted separately, the video data 210 and the audio data 212 may be combined to form audio/video data, such as a movie, a recorded television program, or other audio/video content.

The processor controlled functions 214 include playback functions 216. The playback functions 216, when executed, may transmit the audio data 212, the video data 210, or any combination thereof, stored in the memory 206 to the audio output 226 and to the video output 228. In a particular embodiment, the electronic device 202 may function as a digital video recorder (DVR) that enables a user to record audio content received via the audio input 234 and to record video content received via the video input 236. The electronic device 202 may further function to playback the audio content and the video content at the user's request. The playback functions 216 may also, when executed, pause playback of the audio content and the video content, fast forward through the audio content and the video content, and carry out other DVR functions. In additional embodiments, the electronic device 202 may be a television set, a home appliance, a gaming console, or a personal computer.

The remote control device interface 238 may be used to communicate wirelessly with the remote control device 246. For example, the remote control device interface 238 may be used to communicate the codes 208 to the remote control device 246 over the wireless path 242. In a particular embodiment, the remote control device interface 238 is embodied as a wireless transceiver. The remote control device interface 238 may communicate using various wireless standards including 802.11 (Wi-Fi) and ultra-wideband.

The remote control signal receiver 240 may be configured to communicate wirelessly with the remote control device 246. For example, the remote control signal receiver 240 may be used to receive signals 232 sent wirelessly from the remote control device 246 via a wireless communication path 244. The signals 232 may represent a particular code of the codes 208 associated with a particular function of the processor controlled functions 214 to be executed at the electronic device 202. The remote control signal receiver 240 may be embodied, for example, as an IR receiver or an RF receiver.

The signal processing module 230 may be configured to analyze the signals 232 received from the remote control device 246 to determine a digital representation of the signals 232. For example, the signal processing module 230 may be configured to demodulate the signals 232 to produce a bit pattern corresponding to the signals 232. The bit pattern or other digital representation of the signals 232 may be output from the signal processing module 230 as remote control (RC) data 224.

The RC data analysis module 220 may be configured to determine a particular function of the processor controlled functions 214 to be executed at the electronic device 202 in response to the signals 232 received from the remote control device 246. The RC data analysis module 220 may be configured to access a data source that includes a mapping between the RC data 224 and the processor controlled functions 214. For example, the data source may map a particular bit pattern to a particular processor controlled function, so that that RC data analysis module 220 may issue a command 218 to perform the particular processor controlled function corresponding to the particular bit pattern derived from the received signal 232.

The electronic device 202 may be a UPnP compatible device and may include a UPnP interface 222. The UPnP interface 222 may be configured to enable the electronic device 202 to dynamically join a network, obtain an internet protocol (IP) address, broadcast an identifier of the electronic device 202, convey capabilities of the electronic device 202 upon request from another network device, and discover the presence and capabilities of other network devices in accordance with UPnP protocols. For example, the electronic device 202 may include a dynamic host configuration protocol (DHCP) client (not shown) configured to obtain an IP address from a DHCP host. Once the electronic device 202 has acquired an IP address, the electronic device 202 may transmit a simple service discovery protocol (SSDP) discovery message to a control point for the network. The SSDP discovery message may include an identifier for the electronic device 202, a device type of the electronic device 202, and a pointer, such as a uniform resource locater (URL), to more detailed information about the electronic device 202. The control point may subsequently retrieve additional information about the electronic device 202 using the URL contained in the discovery message or from a device description document stored by the electronic device 202. The additional information about the electronic device 202 may include a listing of services provided by the electronic device 202 that may be made available to other networked devices via the control point.

During operation, the electronic device 202 is configured to send codes 208 to the remote control device 246. The codes 208 may be sent to the remote control device 246 in response to physical contact between the electronic device 202 and the remote control device 246. For example, the electronic device 202 may include a docking station or other component configured for physical mating with the remote control device 246. Alternatively, the electronic device 202 may communicate the codes 208 to the remote control device 246 upon detecting that the remote control device 246 is sufficiently close in physical proximity to the electronic device 202. For example, the electronic device 202 may be configured such that the codes 208 are communicated to the remote control device 246 wirelessly any time that the remote control device 246 is close enough to the electronic device 202 to receive communications from the remote control device interface 238.

The codes 208 are usable by the remote control device 246 to remotely control one or more functions of the electronic device 202. The codes 208 that are transmitted from the electronic device 202 to the remote control device 246 may be stored in a memory (not shown) of the remote control device 246. After the remote control device 246 has received and stored the codes 208, the remote control device 246 can send signals to initiate execution of the processor controlled functions 214 at the electronic device 202. For example, the remote control device 246 may initiate execution of the processor controlled functions 214 at the electronic device 202 by transmitting a signal 232 that is received at the remote control signal receiver 240 of the electronic device 202. The signal 232 may be translated into a particular code that is associated with a particular processor controlled function and the processor 204 may execute the particular processor controlled function. Executing a particular processor controlled function may be carried out by issuing a command 218 to execute the particular processor controlled function at the electronic device 202. For example, a command 218 may be issued to adjust the tint of a display or to adjust a contrast ratio of a display. Additional commands may be issued to display a list of available content that may be delivered via the electronic device 202, to schedule content for recording at the electronic device 202, or to fast-forward through content being delivered via the electronic device 202.

The system 200 may enable a remote control device to be programmed automatically by being located within communication range of an electronic device. Because the electronic device may be configured to transmit function initiating codes to a remote control device, the remote control device may be programmed automatically without a user performing the task of manually entering codes to program the remote control device. Thus, when a remote control device is within communication range of the electronic device, the remote control device may be automatically programmed such that the remote control device may be used to control the electronic device.

Figure 3:
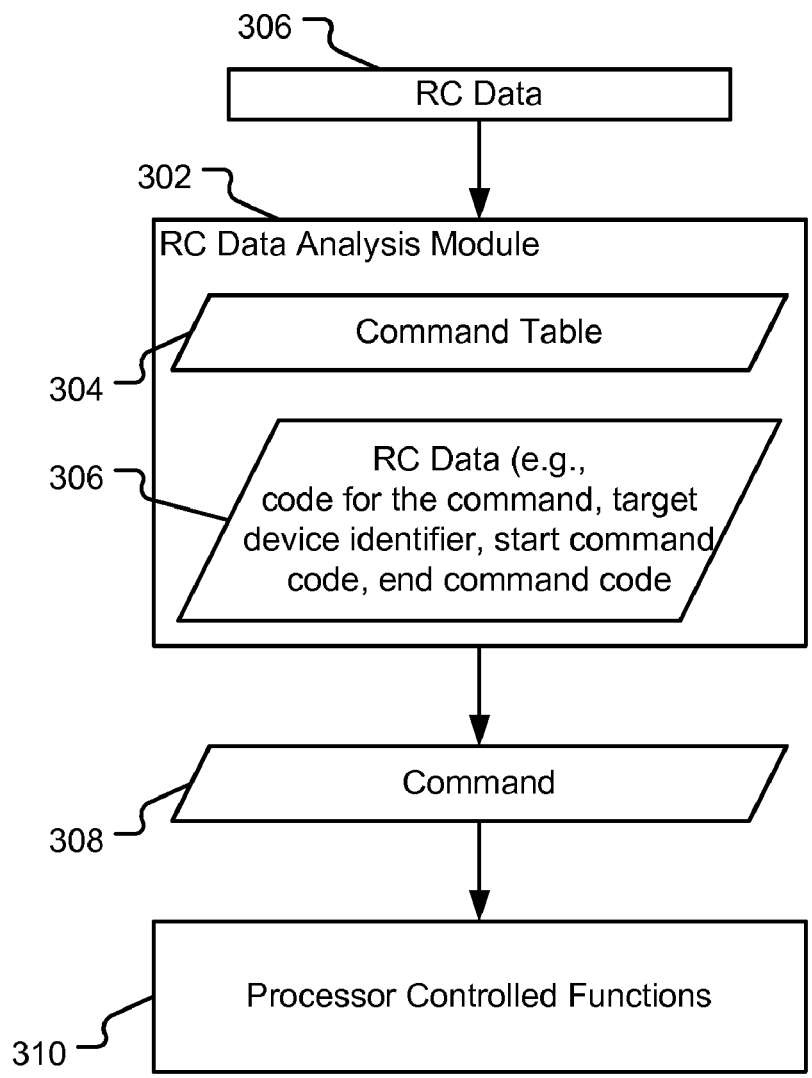
FIG. 3 is a block diagram of a particular embodiment of the remote control data analysis module of FIG. 2.

To further describe the RC data analysis module 220 of the electronic device 202, FIG. 3 depicts a particular embodiment of an RC data analysis module that may be included in the electronic device 202. Referring to FIG. 3, an RC data analysis module 302 and processor controlled functions 310 are depicted. In an illustrative embodiment, the RC data analysis module 302 is the RC data analysis module 220 of FIG. 2 and the processor controlled functions 310 are the processor controlled functions 116, 214 of FIGS. 1-2. The RC data analysis module 302 may include a command table 304 that associates RC data 306 to processor controlled functions 310. The RC data analysis module 302 may be configured to receive RC data 306. The RC data 306 may include a code for a command to be issued and an identifier for the device that should execute the command. The RC data analysis module 302 is configured to compare the RC data 306 to information stored in the command table 304 to identify one or more processor controlled functions 310 to be executed at an electronic device. Information stored in the command table 304 may include a mapping of codes to processor control functions 314 that may be executed for a particular electronic device.

During operation, the RC data analysis module 302 may receive the RC data 306 and may compare the RC data 306 to information stored in the command table 304 to determine a particular function to be executed at an electronic device. The RC data analysis module 302 may subsequently issue a command 308 to perform a particular function at an electronic device. The command 308 may be a call to a processor controlled function 310 or other instruction to execute a particular processor controlled function 310. The executed function may alter some attribute of an electronic device, such as altering the volume of an audio output, or may alter a property of a display. In addition, the executed function may change the setting of a tuner at an electronic device, may change the designated input (e.g., a first HDMI port, a second HDMI port, a universal serial bus (USB) port, or an S-Video port) for receiving content at the electronic device, may cause the electronic device to record content being delivered via the electronic device, may cause the electronic device to stop, pause, play, rewind, or fast-forward content being delivered via the electronic device, or may select a designated menu item displayed via the electronic device.

Figure 4:
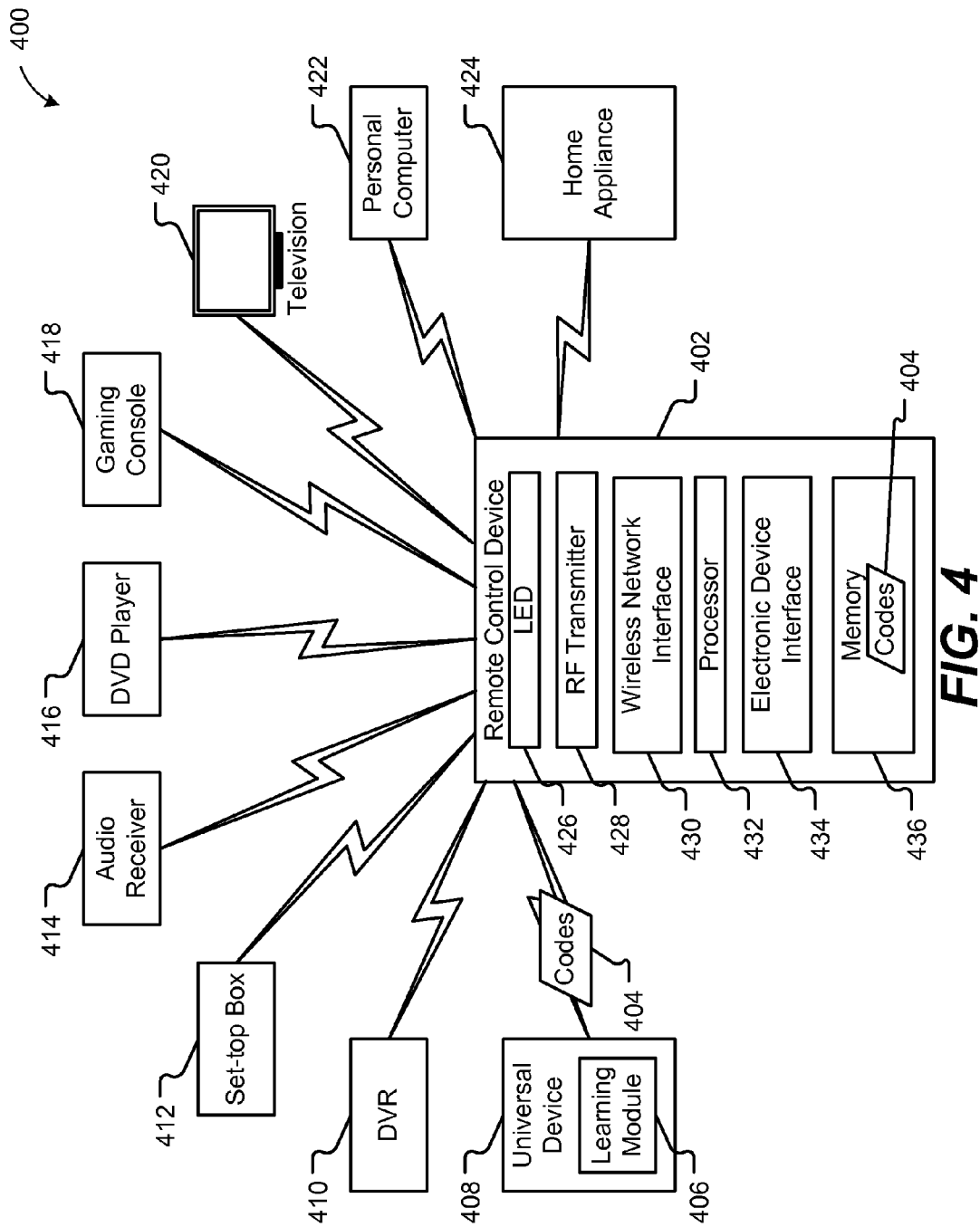
FIG. 4 is a block diagram of a particular embodiment of a system to wirelessly control a plurality of devices with the remote control device of FIGS. 1-2.

Referring to FIG. 4, a system 400 for controlling a plurality of electronic devices via a remote control device is displayed. The system 400 may include electronic devices controllable by a remote control device. For example, the system may include a universal device 408, a digital video recorder (DVR) 410, a set top box 412, an audio receiver 414, and a digital video disc (DVD) player 416. The system 400 may further include a gaming console 418, a television 420, a personal computer 422, and a home appliance 424.

The remote control device 402 includes a processor 432 and may include an LED 426 that may be configured to emit a series of infrared light pulses representing an instruction to perform a particular function at one of the electronic devices 408, 410, 412, 414, 416, 418, 420, 422, and 424. The remote control device 402 may further include an electronic device interface 434 configured to receive codes 404 from one or more of the electronic devices 408, 410, 412, 414, 416, 418, 420, 422, and 424. The codes 404 may be accessible by the processor 432 to communicate commands to control functions of one or more of the electronic devices 408, 410, 412, 414, 416, 418, 420, 422, and 424. Such codes 404 may be stored in a memory 436 that is accessible to the processor 432.

The remote control device 402 may further include an RF transmitter 428. The RF transmitter 428 may be configured to transmit radio signals representing an instruction to perform a particular function at one of the electronic devices 408, 410, 412, 414, 416, 418, 420, 422, and 424. The remote control device 402 may also include a wireless network interface 430. The wireless network interface 430 may be configured to wirelessly transmit packet-based data representing an instruction to perform a particular function at one of the electronic devices 408, 410, 412, 414, 416, 418, 420, 422, and 424. The remote control device 402 may therefore be configured to communicate instructions to one or more of the electronic devices 408, 410, 412, 414, 416, 418, 420, 422, and 424 via the LED 426, the RF transmitter 428, and the wireless network interface 430. Although the remote control device 402 depicted in FIG. 4 includes the LED 426, the RF transmitter 428, and the wireless network interface 430, in alternative embodiments, the remote control device 402 may include only one of the LED 426, the RF transmitter 428, the wireless network interface 430, or any combination thereof.

During operation, the remote control device 402 may be configured to send signals to a plurality of electronic devices (e.g., one or more of the electronic devices 408, 410, 412, 414, 416, 418, 420, 422, and 424) via a wireless connection. Such signals may represent an instruction to perform some function at the electronic device, thereby enabling the remote control device 402 to control a plurality of electronic devices. For example, the remote control device 402 may send signals to the DVR 410, the set top box 412, or any of the other electronic devices. Signals may be sent from the remote control device 402 via the LED 426, the RF transmitter 428, and/or the wireless network interface 430, thereby enabling the remote control device 402 to transmit signals to devices with differing signal processing capabilities. Each of the electronic devices 408, 410, 412, 414, 416, 418, 420, 422, and 424 may include one or more receivers to receive signals from the LED 426, the RF transmitter 428, and/or the wireless network interface 430 of the remote control device 402. For example, each of the electronic devices 408, 410, 412, 414, 416, 418, 420, 422, and 424 may include an RF receiver, an infrared receiver, a wireless network interface controller, or any combination thereof.

The system 400 may enable a single remote control device to control the operations of a plurality of electronic devices. The system 400 may also enable a plurality of devices to be controlled by a single remote control device, even when the plurality of devices having distinct signal processing capabilities. For example, multiple devices may be controlled by a single remote control device, even if one of the devices is only capable of processing an IR signal, another device is only capable of processing an RF signal, and another device is only capable of processing a packet-based signal. In addition, because the remote control device may be configured to transmit different types of signals, the remote control device may be capable of controlling an electronic device from a greater distance. For example, in order to effectively transmit an IR signal, an unobstructed line-of-sight is needed between a remote control device and a target electronic device. Because the remote control device 404 depicted in FIG. 4 can also communicate RF signals and packet-based signals, which can be received by a target electronic device when there is not an unobstructed line-of-sight between the remote control device 404 and the target electronic device, the remote control device 404 may be able to control electronic devices from a greater range. For example, the remote control device 404 may be able to control a target electronic device from locations that do not include an unobstructed line-of-sight between the remote control device 404 and the target electronic device.

In an alternative embodiment, the remote control device 402 may be used to send codes 404 to a universal device 408. In such an example, the universal device 408 may include a remote control device interface (not shown) that is configured to receive the codes 404 from the remote control device 402. The codes 404 may be received by the universal device 408 and transmitted to a learning module 406. The codes may be used by the learning module 406 to program the universal device 408 to respond to the codes 404 transmitted by the remote control device 402 rather than programming the remote control device 402 to generate signals according to codes specified by the universal device 408. The device 408 is therefore a 'universal' device in the sense that the device 408 is programmed to respond to a command set specified by the remote control device 402, rather than programming the remote control device 402 to issue signals in accordance with a command set specified by the universal device 408.

In this alternative embodiment, the remote control device 402 may be configured to detect the presence of the universal device 408 and further configured to transmit the codes 404 upon determining that the universal device 408 is within communication range of the remote control device 402. Alternatively, the remote control device 402 may include a button that, when pressed by a user, transmits the codes 404 to the universal device 408. In this embodiment, the remote control device 402 programs an electronic device, rather than requiring the electronic device to transmit the codes 404 to the remote control device 402 to program the remote control device 402.

Figure 5:
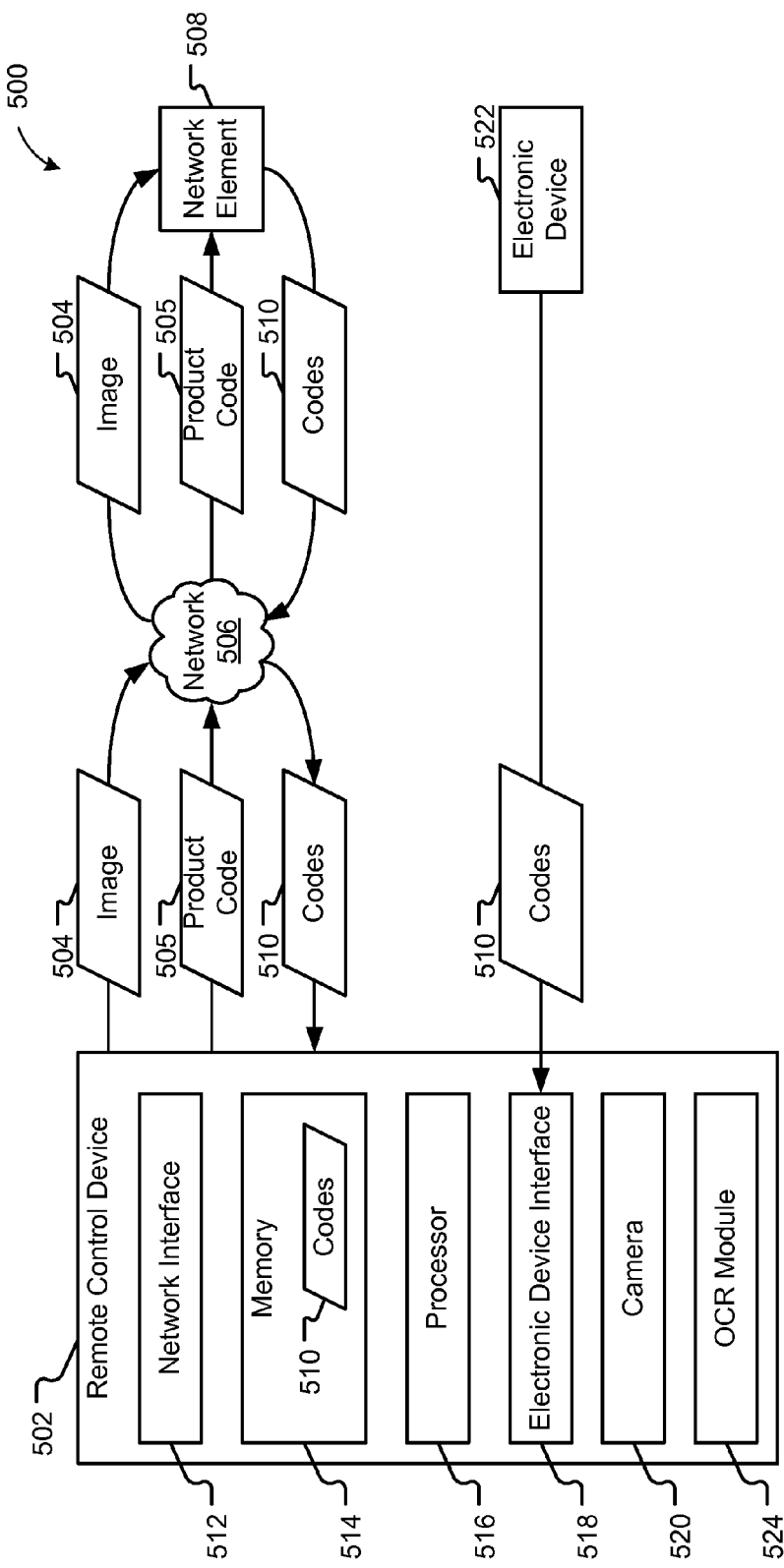
FIG. 5 is a block diagram of a third particular embodiment of a system to program a remote control device.

Referring to FIG. 5, a system for programming a remote control device is depicted and generally designated 500. The system 500 includes a remote control device 502, an electronic device 522, and a network element 508. In an illustrative embodiment, the remote control device 502 is the remote control device 126 of FIG. 1, the electronic device 522 is the electronic device 102 of FIG. 1, and the network element 508 is the network element 110 of FIG. 1.

The remote control device 502 includes a network interface 512, a memory 514, a processor 516, an electronic device interface 518, a camera 520, and an optical character recognition (OCR) module 524. The network interface 512 may be configured to communicate with the network element 508 via a network 506. The camera 520 may be embodied as a digital camera or any device capable of capturing digital images. The camera 520 may be embedded in the remote control device 502 and is operable via use of the remote control device 502. The OCR module 524 may be configured to translate an image of text into machine-readable text, such as translating a Graphics Interchange Format (GIF) image of text into American Standard Code for Information Interchange (ASCII) encoded data representing the text.

The remote control device 502 further includes an electronic device interface 518 configured to receive codes 510 from one or more electronic devices, such as the electronic device 522. The codes 510 may be accessible by the processor 516 and may be transmitted by the remote control device 502 to control functions of one or more electronic devices, such as the electronic device 522. Such codes 510 may be stored in memory 514 that is accessible to the processor 516.

During operation, the camera 520 of the remote control device 502 may be used to capture an image 504 of the electronic device 522. The image 504 of the electronic device 522 may be transmitted via the network interface 512 to the network element 508. In response to receiving the image 504, the network element 508 may identify the electronic device 522 depicted in the image 504 and is configured to transmit the codes 510 to the remote control device 502. The codes 504 may be used by the remote control device 502 to control one or more functions at the electronic device 522 depicted in the image 504. The network element 508 may be embodied, for example, as a server or other data source capable of storing the codes 510 associated with the electronic device 522 and includes a transmitter to transmit the codes 510 to the remote control device 502.

In an alternative embodiment, the camera 520 may be used to capture an image of a product code of the electronic device 522. For example, the camera 520 may be used to capture an image of a product label or other portion of the electronic device 522 that includes a unique identifier (e.g., a model number or a serial number). Such an image may be examined by the OCR module 524, which may be configured to process the captured image to determine a product code 505 of the electronic device 522. The product code 505 may be transmitted to the network element 508 via the network 506. In response to receiving the product code 505, the network element 508 may identify a set of codes 510 for controlling one or more functions at the specific electronic device 522 identified by the product code 505. For example, the network element 508 may include a data repository that maps a particular product code 505 for a particular electronic device to a particular set of codes 510 that may be used by the remote control device 502 to control one or more functions at the particular electronic device 522. The network element 508 transmits the codes 510 for controlling one or more functions at the electronic device 522 to the remote control device 502.

The system 500 may enable a remote control device to be programmed automatically by capturing an image related to an electronic device to be controlled by the remote control device. Thus, the remote control device may be programmed automatically without the user performing the task of manually entering codes to program the remote control device. For example, the user may use the remote control device to capture an image of a barcode or other product identifier located on the back of the user's television. The user may then cause the captured image to be transmitted to the network element. For example, the remote control device may include a button that, when pressed by the user, transmits all images captured by the remote control device to the network element via a wireless network interface of the remote control device. After the images have been received at the network element, the network element may perform optical character recognition (OCR) operations on the images to produce computer-readable data corresponding to the barcode or other product identifier captured in the image. The computer-readable data may be used by the network element to perform a lookup operation in a data repository that maps product identifiers for electronic devices to sets of codes that may be used by a remote control device to control one or more functions at each of the electronic devices. If the network element determines that a set of codes exists for a particular product identifier extracted from a captured image, the network element may transmit the set of codes to the remote control device that captured the image.

Figure 6:
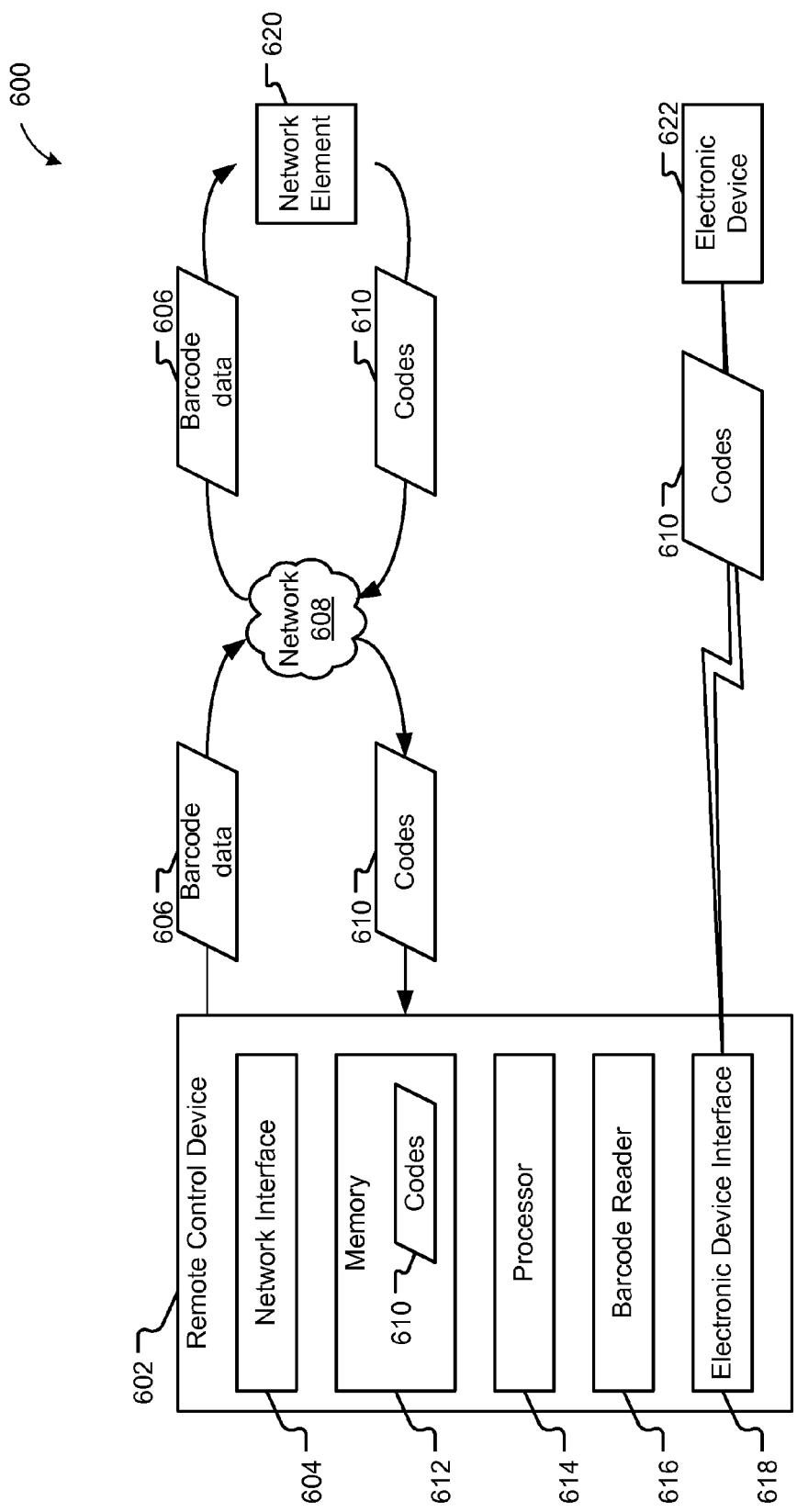
FIG. 6 is a block diagram of a fourth particular embodiment of a system to program a remote control device.

Referring to FIG. 6, a particular embodiment of a system for programming a remote control device is depicted and generally designated 600. The system includes a remote control device 602, an electronic device 622, and a network element 620. In an illustrative embodiment, the remote control device 602 is the remote control device 126 of FIG. 1, the electronic device 622 is the electronic device 102 of FIG. 1, and the network element 620 is the network element 110 of FIG. 1. The remote control device 602 includes a network interface 604, a memory 612, a processor 614, a barcode reader 616, and an electronic device interface 618.

The electronic device interface 618 is configured to receive codes 610 from one or more electronic devices. The codes 610 may be accessible by the processor 614 to transmit signals from the remote control device 602 to control functions of one or more electronic devices. Such codes 610 may be stored in a memory 612 that is accessible to the processor 614.

The barcode reader 616 may be configured to read a printed barcode, such as a printed barcode attached to the electronic device 622 that identifies the electronic device 622. The barcode reader 616 may be embedded within the remote control device 602. The barcode reader 616 may be configured to translate a printed barcode's image into machine-readable data to produce barcode data 606.

During operation, the remote control device 602 may utilize the barcode reader 616 to identify the barcode data 606 for the electronic device 622. The barcode data 606 may be transmitted to the network element 620 via the network 608. In response to receiving the barcode data 606, the network element 620 may be configured to identify the electronic device 622 associated with the barcode data 606 and may be further configured to transmit the codes 610 for controlling the electronic device 622 associated with the barcode data 606 to the remote control device 602. The codes 610 may be received at the remote control device 602 and stored in the memory 612. The codes 610 may be utilized by the remote control device 602 to control the operation of the electronic device 622.

The system 600 may enable a remote control device to be automatically programmed by scanning a barcode associated with an electronic device. Thus, the remote control device may be automatically programmed without a user performing the task of manually entering codes to program the remote control device. For example, the user may use the remote control device to scan a barcode located on the back of the user's television. The user may then cause the barcode to be transmitted to the network element. For example, the remote control device may include a button that, when pressed by the user, transmits all barcodes captured by the remote control device to the network element via a wireless network interface of the remote control device. After the barcodes have been received at the network element, the network element may use the barcode data to perform a lookup operation in a data repository that maps barcodes for electronic devices to sets of codes that may be used by a remote control device to control one or more functions at each of the electronic devices. If the network element determines that a set of codes exists for a particular barcode, the network element may transmit the set of codes to the remote control device that scanned the barcode.

Figure 7:
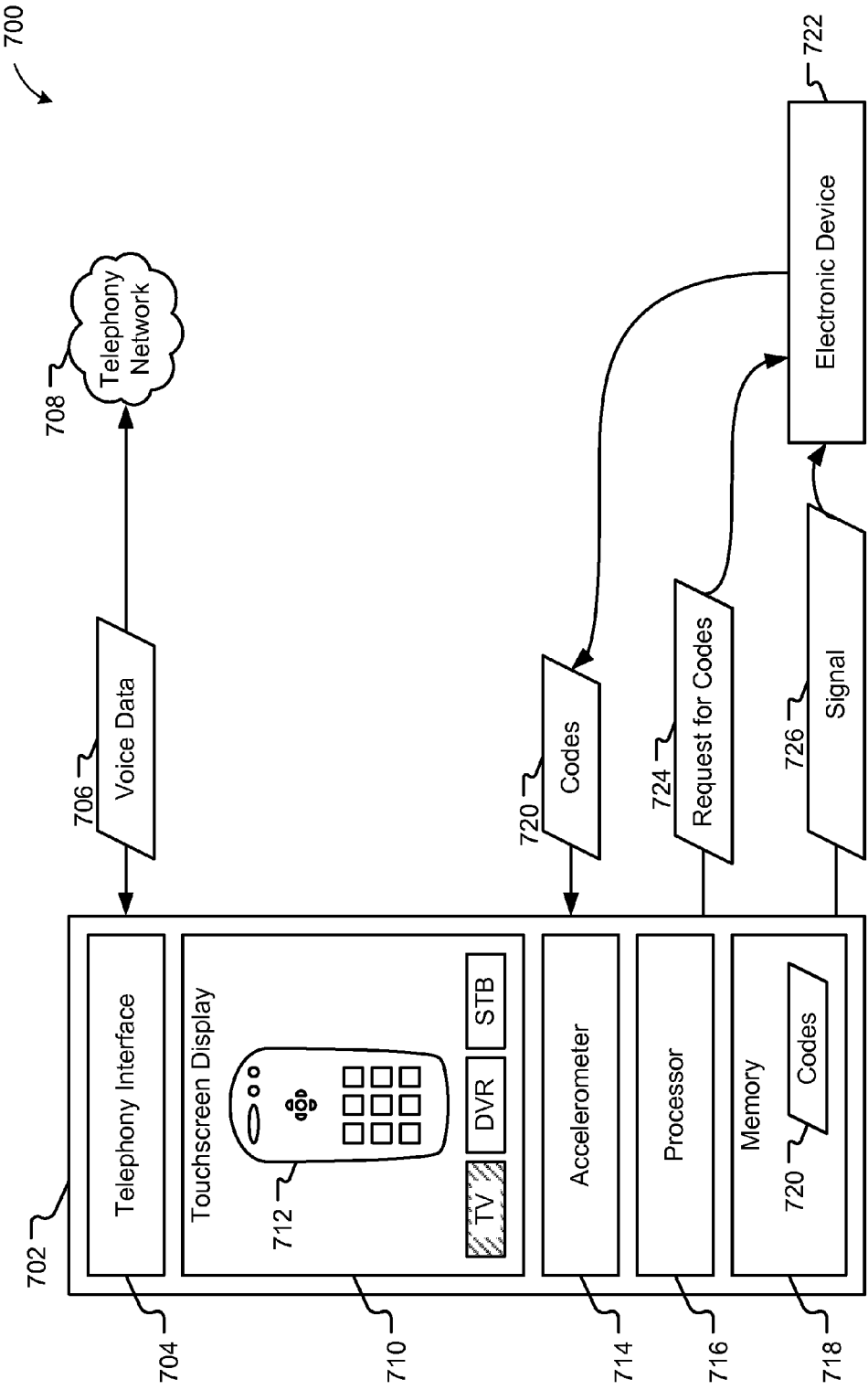
FIG. 7 is a block diagram of a fifth particular embodiment of a system to program a remote control device.

Referring to FIG. 7, a system for programming a remote control device is depicted and generally designated 700. The system 700 includes a remote control device 702, an electronic device 722, and a telephony network 708. In an illustrative embodiment, the remote control device 702 is the remote control device 126 of FIG. 1, and the electronic device 722 is the electronic device 102 of FIG. 1. The remote control device 702 includes a telephony interface 704, a touch screen display 710, an accelerometer 714, a processor 716, and a memory 718. The telephony interface 704 may be configured to send and receive voice data 706 from a telephony network 708. In a particular embodiment, the remote control device 702 may operate as a fully functioning telephone. For example, the remote control device 702 may be embodied as a smartphone capable of voice communications and data communications.

The touchscreen display 710 may be configured to display a user interface 712 for controlling functions of one or more electronic devices, such as the electronic device 722. In a particular embodiment, the user interface 712 emulates a layout of another remote control device. For example, the user interface 712 may emulate a layout of an original manufacturer's remote control sold with the electronic device 722. The remote control device 702 may therefore be configured such that particular location on the touchscreen display 710 is mapped to a particular code usable by the remote control device 702 for controlling the electronic device 722. When a user touches the touchscreen display 710, the remote control device 702 determines the particular code that is associated with the portion of the touchscreen display 710 that was touched and emits a signal to transmit the particular code.

In a particular embodiment, the touchscreen display 710 may include toggle buttons that enable a user to switch between various user interfaces associated with various electronic devices. For example, the remote control device 702 may be configured to control a television set, a DVR, and an audio-video (AV) receiver located at a user's home theatre system. If the television set, DVR, and AV receiver each have a manufacturer's remote control, the remote control device 702 may be configured to emulate a layout for each of the manufacturer's remote controls. The touchscreen display 710 may display three icons labeled "TV," "DVR," and "AV Receiver." When the user touches the icon labeled "TV," the remote control device 702 may emulate a layout of the television manufacturer's remote control. When the user touches the icon labeled "DVR," the remote control device 702 may emulate a layout of the DVR manufacturer's remote control. When a user touches the icon labeled "AV Receiver," the remote control device 702 may emulate a layout of the AV receiver manufacturer's remote control.

The remote control device 702 may also include an accelerometer 714. The remote control device 702 may be configured to issue a request 724 for codes 720 in response to determining, via the accelerometer 714, that the remote control device 702 is being moved in a predetermined pattern. For example, the remote control device 702 may be configured to issue a request 724 for the codes 720 when the remote control device 702 is being moved in a counterclockwise circle. The accelerometer 714 may be used to detect movement of the remote control device 702 such that the remote control device 702 may identify patterns of movement and take related actions responsive to the detected movement. The electronic device 722 may be configured to transmit the codes 720 for controlling the electronic device 722 upon receipt of the request 724 for the codes 720.

During operation, the remote control device 702 may be programmed by receiving the codes 720 from the electronic device 722 for controlling functions that are executable at the electronic device 722. The remote control device 702 may construct a user interface 712 at the touchscreen display 710 that enables a user to transmit a signal 726 corresponding to a particular code associated with a particular function at a particular electronic device. The signal 726 may be received at the electronic device 722, and the signal 726 may be processed at the electronic device 722 to perform a function at the electronic device 722. The user interface 712 at the remote control device 702 may emulate another remote control device. Alternatively, the user interface 712 may be constructed according to other design preferences (e.g., user preferences).

The system 700 may enable a remote control device to be automatically programmed by moving the remote control device in a predetermined pattern. Thus, the remote control device may be automatically programmed without a user performing the task of manually entering codes to program the remote control device 702. For example, the remote control device 702 may be configured such that the remote control device 702 may request codes from one or more electronic devices when the remote control device 702 is moved in consecutive counter-clockwise circles. When the remote control device 702 determines, via the accelerometer 714, that the remote control device 702 has been moved in consecutive counter-clockwise circles, the remote control device 702 may broadcast a request for codes to all electronic devices within communication range of the remote control device 702. Any electronic device, such as electronic device 722, that receives the request for codes may subsequently transmit the codes 720 to the remote control device 702.

Figure 8:
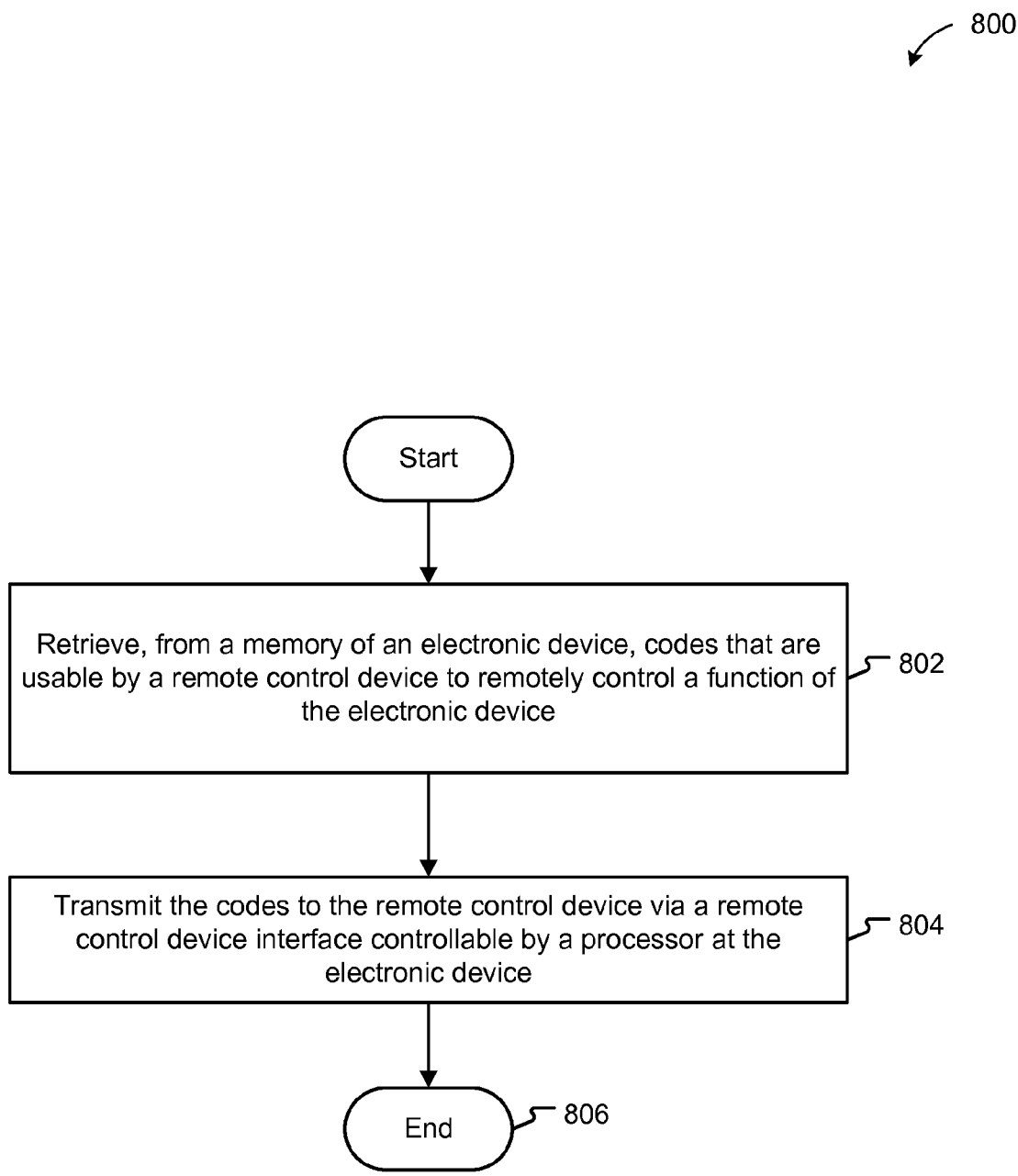
FIG. 8 is a flow diagram of a first particular embodiment of a method to program a remote control device.

Referring to FIG. 8, a particular embodiment of a method for programming a remote control device is illustrated and generally depicted 800. In an illustrative embodiment, the method may be performed by the remote control device 126 of FIG. 1 and the electronic device 102 of FIG. 1. The method includes retrieving, from a memory of an electronic device, codes that are usable by a remote control device to remotely control a function of the electronic device, at 802. For example, in FIG. 1, codes 106 may be retrieved from the memory 112 of the electronic device 102. Such codes 106 may be usable by the remote control device 126 to remotely control a function of the electronic device 102.

Moving to 804, the method includes transmitting the codes to the remote control device. The codes may be transmitted via a remote control device interface that is controllable by a processor at the electronic device. For example, in FIG. 1, the codes 106 may be transmitted from the electronic device 102 to the remote control device 126 via the remote control device interface 122 of the electronic device 102. The method terminates at 806.

The method 800 may enable a remote control device to be programmed automatically when the remote control device is located within communication range of an electronic device. Because the electronic device may be configured to transmit function initiating codes to the remote control device, the remote control device may be programmed automatically, without a user performing the task of manually entering codes to program the remote control device. Thus, when a remote control device is within communication range of the electronic device, the remote control device may be automatically programmed such that the remote control device may be used to control one or more functions of the electronic device.

Figure 9:
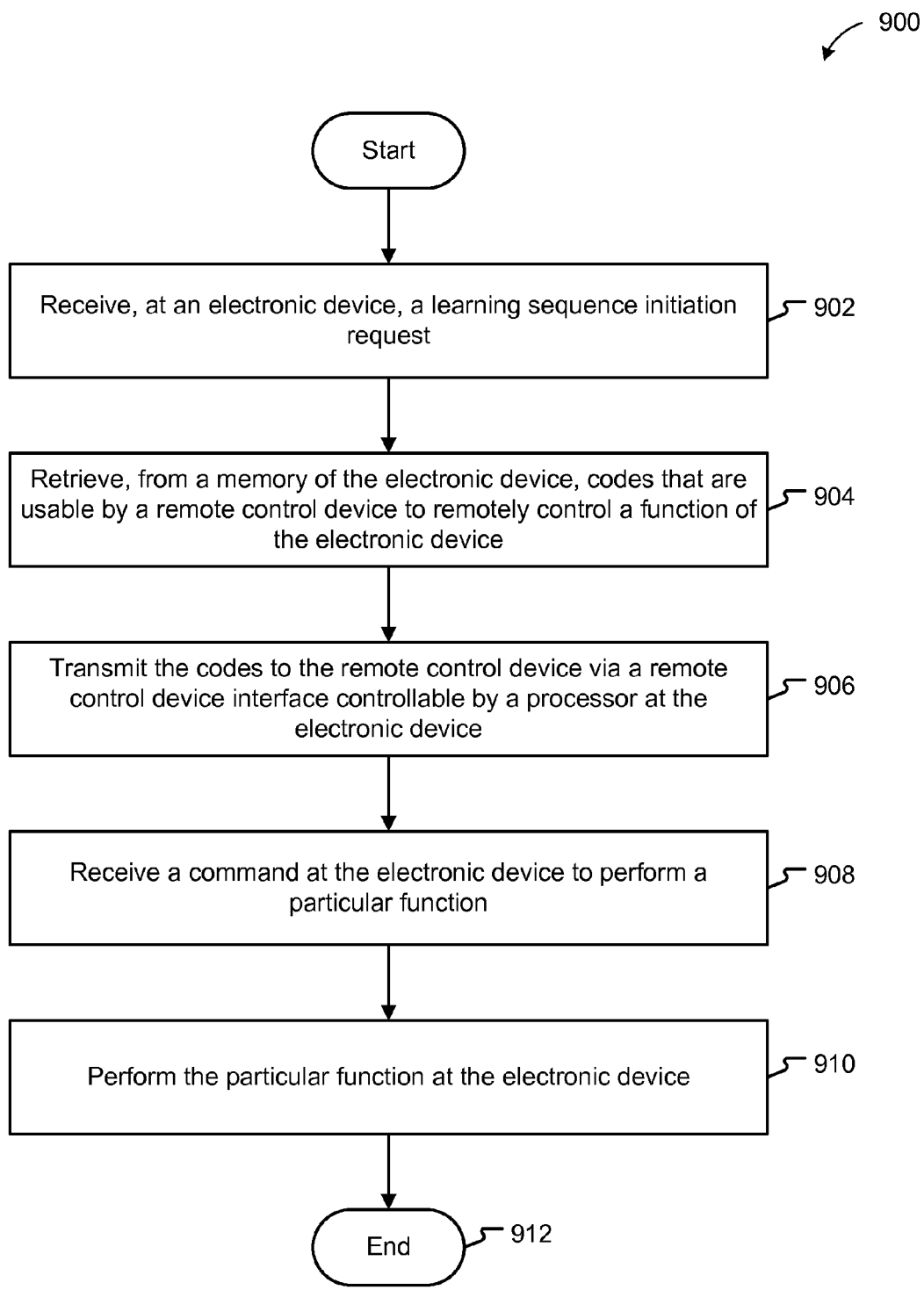
FIG. 9 is a flow diagram of a second particular embodiment of a method to program a remote control device.

Referring to FIG. 9, a particular embodiment of a method for programming a remote control device is illustrated and generally depicted 900. In an illustrative embodiment, the method may be performed by the remote control device 126 of FIG. 1 and the electronic device 102 of FIG. 1. The method includes receiving a learning sequence initiation request at an electronic device, at 902. A learning sequence includes a series of messages transmitted between an electronic device and a remote control device. For example, the learning sequence may include a first message sent from the remote control device to the electronic device requesting codes that may be used by the remote control device to control one or more functions at the electronic device. The learning sequence may further include a second message sent from the electronic device to the remote control device that includes a first code for controlling a first function at the electronic device. The learning sequence may also include a third message sent from the remote control device to the electronic device confirming that the second message was received by the remote control device. Upon receipt of this confirmation message, the electronic device may send a fourth message to the remote control device that includes a second code for controlling a second function at the electronic device. The learning sequence may continue in a similar fashion until all codes for controlling all functions at the electronic device, or all of the remotely controllable functions, have been sent from the electronic device and received by the remote control device.

The learning sequence initiation request may be transmitted from the remote control device to the electronic device. The learning sequence initiation request may represent a request by the remote control device to receive codes usable by the remote control device to control one or more functions at the electronic device. For example, in FIG. 1, the remote control device 126 may send a request for the codes 106 to the electronic device 102. An illustration of receiving a learning sequence initiation request at an electronic device can be found in FIG. 7, where the remote control device 702 may send a request for codes 724 to the electronic device 722, where the request for codes 724 is a learning sequence initiation request.

Moving to 904, the method includes retrieving codes from a memory of the electronic device. The codes may be usable by a remote control device to remotely control one or more functions of an electronic device. For example, in FIG. 1, the codes 106 may be retrieved from the memory 112 of the electronic device 102. The codes 106 are usable by the remote control device 126 to remotely control one or more functions of the electronic device 102.

Advancing to 906, the method includes transmitting, via a remote control device interface controllable by a processor, the codes to the remote control device. For example, in FIG. 1, the codes 106 may be transmitted from the electronic device 102 to the remote control device 126 via the remote control device interface 122 of the electronic device 102.

Moving to 908, the method includes receiving a command at the electronic device to perform a particular function. For example, in FIG. 1, a command 118 may be received at the display 120 to perform a particular function. As a further example, the display 120 may receive a command to change a contrast ratio of the display 120, to change the brightness of the display 120, or to change the tint of the display 120.

Advancing to 910, the method includes performing the particular function. The particular function may be performed at the device to alter an attribute of the device. An attribute of the device may include a particular setting of the device. For example, attributes for a television set may include a volume setting, a channel setting, an aspect ratio setting, a setting to display closed captioning content, and a brightness setting for the television's display. For example, in FIG. 1, the display 120 may perform a function in response to the command 118. The method terminates at 912.

The method 900 may enable a remote control device to be programmed automatically when the remote control device is located within communication range of an electronic device. Because the electronic device may be configured to transmit function initiating codes to the remote control device, the remote control device may be programmed automatically, without a user performing the task of manually entering codes to program the remote control device. Thus, when the remote control device is within communication range of the electronic device, the remote control device may be automatically programmed such that the remote control device may be used to control one or more functions of the electronic device.

Figure 10:
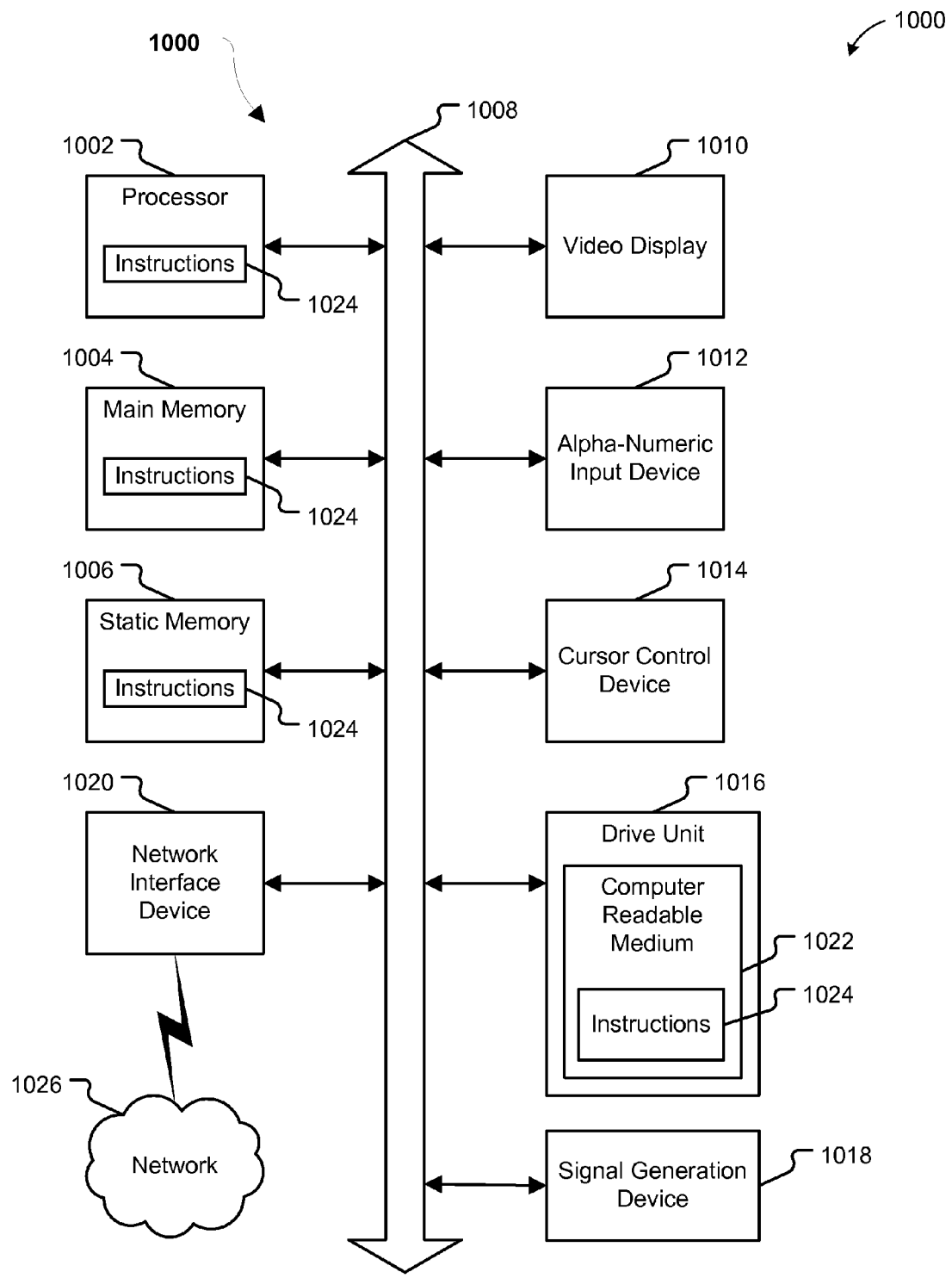
FIG. 10 is a block diagram of an illustrative embodiment of a general computer system.

Referring to FIG. 10, an illustrative embodiment of a general computer system is shown and is designated 1000. The computer system 1000 can include a set of instructions that is executable to cause the computer system 1000 to perform any one or more of the methods or computer based functions disclosed herein. The computer system 1000 may operate as a standalone device or may be connected, e.g., using a network, to other computer systems or peripheral devices. In an illustrative embodiment, the computer system 1000 may include one or more of the electronic device 102, the network element 110, and the remote control device 126 of FIG. 1. Each of the electronic device 102, the network element 110, and the remote control device 126 of FIG. 1 may include or be implemented using the computer system 1000 or a portion thereof. In other illustrative embodiments, the computer system 1000 may include the electronic devices 202, 408, 410, 412, 414, 416, 418, 420, 422, 424, 522, 622, and 722, the network elements 508 and 620, and the remote control devices 246, 402, 502, 602, and 702 of FIGS. 2-7. Each of the electronic devices 202, 408, 410, 412, 414, 416, 418, 420, 422, 424, 522, 622, and 722, the network elements 508 and 620, and the remote control devices 246, 402, 502, 602, and 702 of FIGS. 2-7 may include or be implemented using the computer system 1000 or a portion thereof.

In a networked deployment, the computer system 1000 may operate in the capacity of a server or as a client user computer in a server-client user network environment, or as a peer computer system in a peer-to-peer (or distributed) network environment. The computer system 1000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 1000 may be implemented using electronic devices that provide video, audio, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 may include a main memory 1004 and a static memory 1006, which can communicate with each other via a bus 1008. As shown, the computer system 1000 may further include a video display unit 1010, such as a liquid crystal display (LCD), a projection television system, a flat panel display, or a solid state display. Additionally, the computer system 1000 may include an input device 1012, such as a keyboard, and a cursor control device 1014, such as a mouse. The computer system 1000 may also include a disk drive unit 1016, a signal generation device 1018, such as a speaker or remote control, and one or more network interface devices 1020 capable of communicating with a network 1026. Not all of the components of the computer system 1000 of FIG. 10 may be included in any particular system or electronic device. For example, some computer systems 1000 may not include an input device (e.g., a server may not include a mouse).

In a particular embodiment, as depicted in FIG. 10, the disk drive unit 1016 may include a computer-readable storage medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1024, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 1024. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electronic device comprising:
   a remote control device interface;
   a processor;
   a memory accessible to the processor, the memory including codes transmittable to a remote control device, wherein the codes are usable by the remote control device to remotely control at least one function of the electronic device; and
   a network interface configured to receive the codes from a network element, wherein the codes are received based at least in part on data associated with an image captured by an image capture device;
   wherein the remote control device interface is controllable by the processor to communicate at least one of the codes to the remote control device.

2. The electronic device of claim 1, wherein the remote control device interface includes a wireless transceiver.

3. The electronic device of claim 1, wherein the remote control device interface is operable to communicate the codes to the remote control device in response to physical contact with the remote control device.

4. The electronic device of claim 1, wherein the remote control device interface is further configured to receive the codes from the remote control device.

5. The electronic device of claim 1, further comprising a video output, an audio output, an audio signal input, a video signal input, and a playback module configured to transmit video data stored in the memory to the video output and configured to transmit audio data stored in the memory to the audio output.

6. The electronic device of claim 1, wherein the electronic device is a universal plug and play (UPnP) compatible device configured to dynamically join a network, obtain an IP address, broadcast a name for the electronic device, convey capabilities of the electronic device, and discover presence and capabilities of other devices.

7. The electronic device of claim 1, wherein the data associated with the image includes an image of the electronic device, a product code for the electronic device, or a barcode of the electronic device.

8. A remote control device comprising:
   an electronic device interface;
   a processor;
   a light emitting diode (LED) configured to emit a series of infrared light pulses representing an instruction to perform a particular function at an electronic device;
   a memory accessible to the processor, the memory including codes transmittable to control a function of the electronic device;
   an image capture device configured to capture an image; and
   a network interface configured to send data associated with the image to a network element via the network interface;
   wherein the remote control device is configured to receive the codes from the network element via the network interface.

9. The remote control device of claim 8, wherein the image capture device includes a camera wherein the image includes an image of the electronic device.

10. The remote control device of claim 8, wherein the image capture device includes a camera and an optical character recognition (OCR) module, wherein the data associated with the image includes a product code for the electronic device determined by the OCR module based on the image captured by the camera.

11. The remote control device of claim 8, wherein the image capture device includes a barcode reader, wherein the data associated with the image includes a barcode of the electronic device.

12. The remote control device of claim 8, further comprising a touchscreen display configured to display a user interface for controlling one or more functions of one or more electronic devices.

13. The remote control device of claim 12, wherein the user interface emulates a layout of another remote control device.

14. The remote control device of claim 8, further comprising a radio transmitter configured to transmit radio signals representing the instruction to perform the particular function at the electronic device.

15. The remote control device of claim 8, further comprising a wireless network interface configured to wirelessly transmit packet-based data representing the instruction to perform the particular function at the electronic device.

16. The remote control device of claim 8, further comprising:

an accelerometer;

wherein the remote control device is configured to issue a request for the codes in response to determining via the accelerometer that the remote control device is being moved in a predetermined pattern.

17. The remote control device of claim 8, wherein the memory includes a plurality of codes transmittable to control a plurality of functions at each of a plurality of electronic devices.

18. A method, comprising:

retrieving, from a memory of an electronic device, codes that are usable by a remote control device to remotely control a function of the electronic device, wherein the codes are received from a network element via a network interface of the electronic device, wherein the codes are selected based at least in part on data associated with an image captured by an image capture device; and transmitting the codes to the remote control device via a remote control device interface controllable by a processor of the electronic device.

19. The method of claim 18, further comprising:

receiving a command at the electronic device to perform a particular function; and performing the particular function at the electronic device.

20. The method of claim 18, wherein the data associated with the image includes an image of the electronic device, a product code for the electronic device, or a barcode of the electronic device.

\* \* \* \* \*

UNITED STATES PATENT AND TRADEMARK OFFICE
CERTIFICATE OF CORRECTION

PATENT NO.         : 8,348,145 B2
APPLICATION NO.    : 12/618713
DATED              : January 8, 2013
INVENTOR(S)        : James Pratt It is certified that error appears in the above-identified patent and that said Letters Patent is hereby corrected as shown below:

In the Claims:

Column 18, Claim 9, Line 56, "capture device includes a camera wherein the image includes" should read --capture device includes a camera, wherein the image includes--.

Signed and Sealed this
Fourth Day of June, 2013

Teresa Stanek Rea
*Acting Director of the United States Patent and Trademark Office*